United States Patent [19]

Okumura et al.

[11] Patent Number: 5,012,648
[45] Date of Patent: May 7, 1991

[54] EXHAUST SYSTEM FOR TWO-STROKE ENGINE

[75] Inventors: Shigeo Okumura; Koushiro Inaba, both of Hamamatsu, Japan

[73] Assignee: Sanshin Kogyo Kabushiki Kaisha, Hamamatsu, Japan

[21] Appl. No.: 910,498

[22] Filed: Sep. 22, 1986

[30] Foreign Application Priority Data

Sep. 27, 1985 [JP] Japan ................................ 60-212090

[51] Int. Cl.⁵ .............................................. F02B 27/04
[52] U.S. Cl. .................................................. 60/313
[58] Field of Search ...................... 60/313; 123/55 VS

[56] References Cited

U.S. PATENT DOCUMENTS

| | | | |
|---|---|---|---|
| 3,180,077 | 4/1965 | Berchtold | 60/313 |
| 3,692,006 | 9/1972 | Miller et al. | |
| 3,808,807 | 5/1974 | Lanpheer | 60/313 |
| 3,813,880 | 6/1974 | Reid et al. | |
| 4,187,809 | 2/1980 | Lanpheer | 60/313 |
| 4,370,953 | 2/1983 | Walker | 123/55 VS |

*Primary Examiner*—Douglas Hart
*Attorney, Agent, or Firm*—Ernest A. Beutler

[57] ABSTRACT

An exhaust supercharging arrangement for a two-cycle internal combustion engine having groups of cylinders each of which merge into respective exhaust manifolds. The exhaust manifolds communicate with each other and the firing order is such that the one cylinder of one group is on its scavenge cycle when another cylinder of the other group is on its exhaust cycle for minimizing the torque and heating loading on the engine.

16 Claims, 3 Drawing Sheets

EXHAUST SYSTEM FOR TWO-STROKE ENGINE

BACKGROUND OF THE INVENTION

This invention relates to an exhaust system for two-cycle internal combustion engines and more particularly to an arrangement wherein the engine exhaust system provides a supercharging effect which is controlled so as to limit the likelihood of overheating and misfiring.

It is well known in multiple cylinder, two-cyle internal combustion engines to arrange the exhaust manifolding and firing order in such a way that the exhaust pulses of one cylinder are utilized to create a supercharging effect by generating a pressure pulse at the end of the scavenging stroke of another cylinder so as to insure that the fresh air fuel mixture taken into the cylinder will not be discharged and, furthermore, will be compressed thus providing a supercharging effect. However, such a supercharging effect can increase the heat load on the engine and may cause pre-ignition, knocking or other detrimental combustion characteristics.

It is, therefore, a principal object of this invention to provide an improved exhaust for a two-cycle, multiple cylinder internal combustion engine wherein some exhuast supercharging is obtained, however, the amount of exhaust supercharging is limited so as to reduce slightly the midrange torque and the heat load on the engine.

SUMMARY OF THE INVENTION

This invention is adapted to be embodied in an exhaust system for a two-cycle engine having a first group of cylinders having their exhaust ports communicating with a first exhaust manifold and a second group of cylinders having their exhaust ports all communcating with a second exhaust manifold. In accordance with this invention, the firing orders of the cylinders is such that one cylinder of the first group is on its scavenge cycle when one cylinder of the other group is on its exhaust cycle and means communicate the exhaust manifolds with each other for restricting the scavenging of the cyclinders for restricing torque and heat loading on the engine.

DETAILED DESCRIPTION OF THE PREFERREED EMBODIMENT

Figure 1:
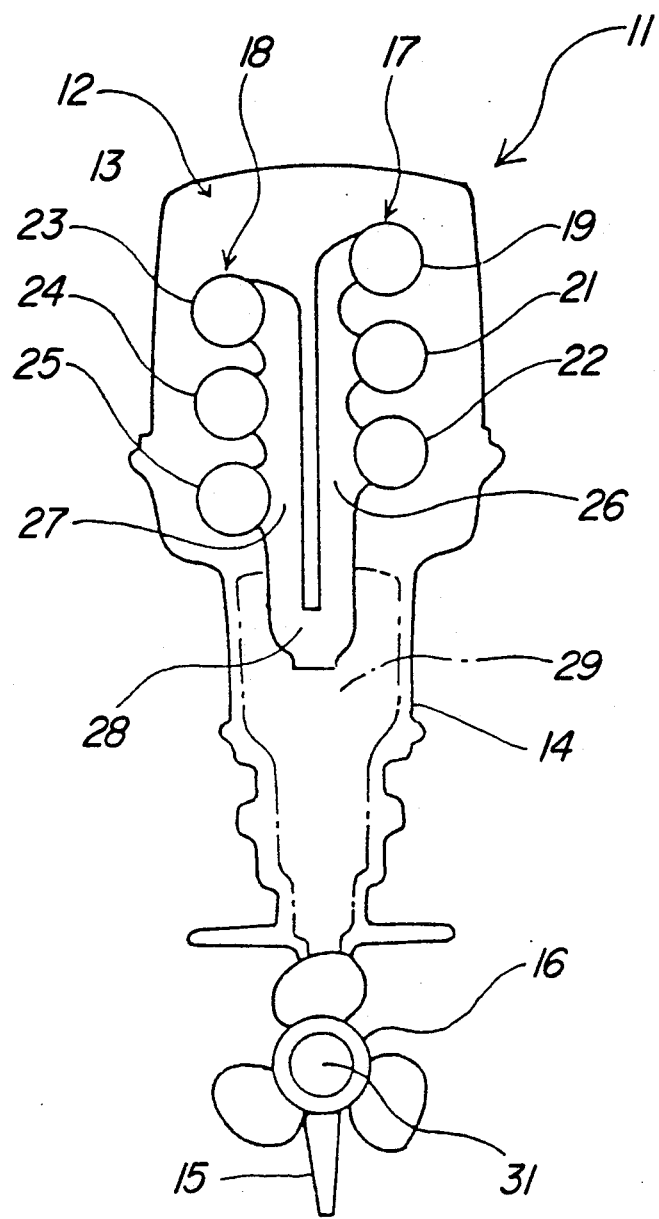
FIG. 1 is a partially schematic rear view of an outboard motor having a two-cycle engine constructed in accordance with an embodiment of the invention.

In FIG. 1, an outboard motor is identified generally by the reference numeral 11 and is shown in rear elevation. The outboard motor 11 includes a power head containing an internal combusiton engine, indicated generally by the reference number 12 and surrounded by a protective cowling 13. A drive shaft housing 14 depends from the power head 13 and contains a drive shaft (not shown) that is driven by the output shaft of the engine 12. A lower unit 15 is positioned beneath the drive shaft housing 14 and supports a propeller 16 that is driven from the drive shaft in a known manner. Further discussion of the details of the outboard motor are not given since an outboard motor is described as only an exemplary embodiment for an application of the invention.

The engine 12 is, in the illustrated embodiment, of the V type and operates on a two-stroke, crankcrase compression principle. The engine is provided with a first bank of cylinders 17 and a second bank of cylinders 18. Contained within the cylinder bank 17 are cylinders 19, 21 and 22 while the bank of cylinders 18 includes cylinders 23, 24 and 25. The engine, being of the V6 type, has the cylinder banks 17 and 18 disposed at a 60 degree angle to each other and the cylinders fire on even firing impulses. The firing order, as indicated by the numbers on the cylinders in FIG. 1, is 19, 23, 21, 24, 22, and 25.

The exhaust ports of the cylinder bank 17 all merge into a first exhaust manifold 26. That is, the exhaust manifold 26 serves the cylinders 19, 21 and 22. As a result, the positive pressure pulse from one of the cylinders in this bank will act on the other cylinders to provided an exhaust supercharging effect. In a similar manner, the exhaust ports of the cylinders 23, 24 and 25 of the bank 187 all merge into a common exhaust manifold 27. Therefore, there will be exhaust supercharging for the cylinders of this bank.

Unlike conventional exhaust supercharged V type engines, the exhaust manifolds 26 and 27 are, in accordance with the invention merged together at a common exhaust outlet 28. Thus, the pressure pulses from the cylinders of each of the banks 17 and 18 may act upon the cylinders of the other bank in a manner to be described. The exhaust outlet 28 discharges the exhaust gases into an expansion chamber 29 that is formed in the drive shaft housing 14 for silencing. The exhaust gases are then discharged through an underwater exhaust discharge such as a through the hub propeller discharge 31.

Figure 2:
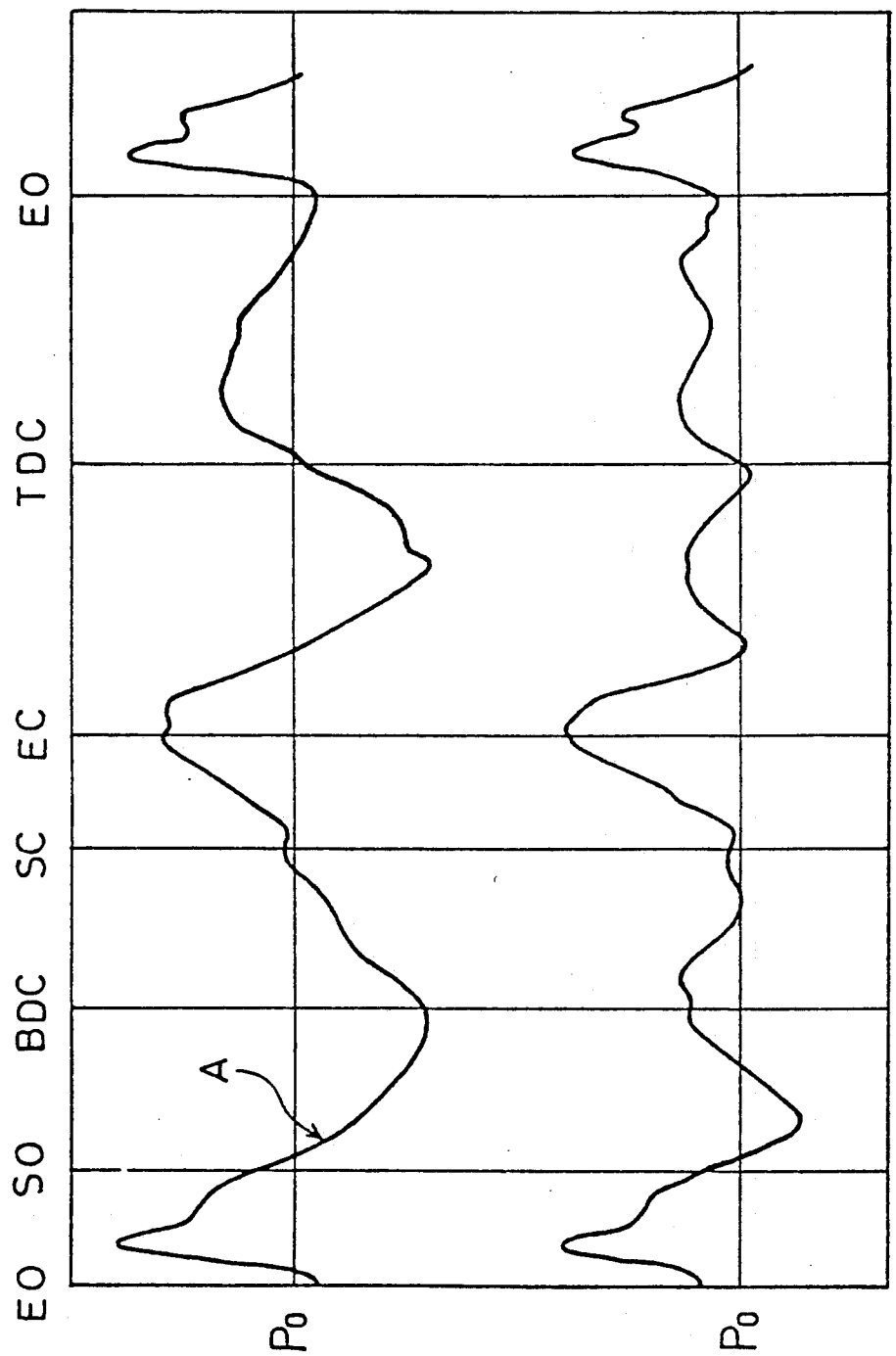
FIG. 2 is a pressure curve showing the pressure versus crankshaft angle in a conventional exhaust supercharged engine and in an engine constructed in accordance with an embodiment of the invention.

Referring now to FIG. 2, the principle of the invention will be described. The curve A shows the pressure at the exhaust port of one cylinder, sych as cylinder 19, of a conventional exhaust supercharged engine. The events of the port opening and closing are indicated as follows:

EO = exhaust port epening,
EC = exhaust port closing,
SO = scavenge port opening,
SC = scavenge port closing,
BDC = bottom dead center,
TDC = top dead center.

It will be seen that the pressure rises abruptly after the exhaust port opens. This pressure falls off and becomes negative after the scavenge port opens and continues to be negative until the scavenge port closes. The firing of another cylinder in the same bank causes an increase in the pressure and causes the pressure to be approximately equal to atmospheric at the time the scavenge port closes. This is what provides the normal exhaust supercharging effect. However, this exhaust supercharging can cause high heat loadings and resultant knocking and other unfavorable combustion conditions.

In accordance with the invention, because of the fact that the exhaust manifolds 26 and 27 communicate with each other at their common outlet 28, there is a positive pressure generated at the exhaust port of the cylinder of the bank 17 when the corresponding cylinder of the bank 18 fires as indicated by the pressure P2 in the curve B. As a result, there is some restriction to the indication of a fresh charge into the combustion chamber and the discharge of the exhaust gases and this small reduction is sufficient so as to reduce the heat loading on the engine and the likelihood of knocking.

Figure 3:
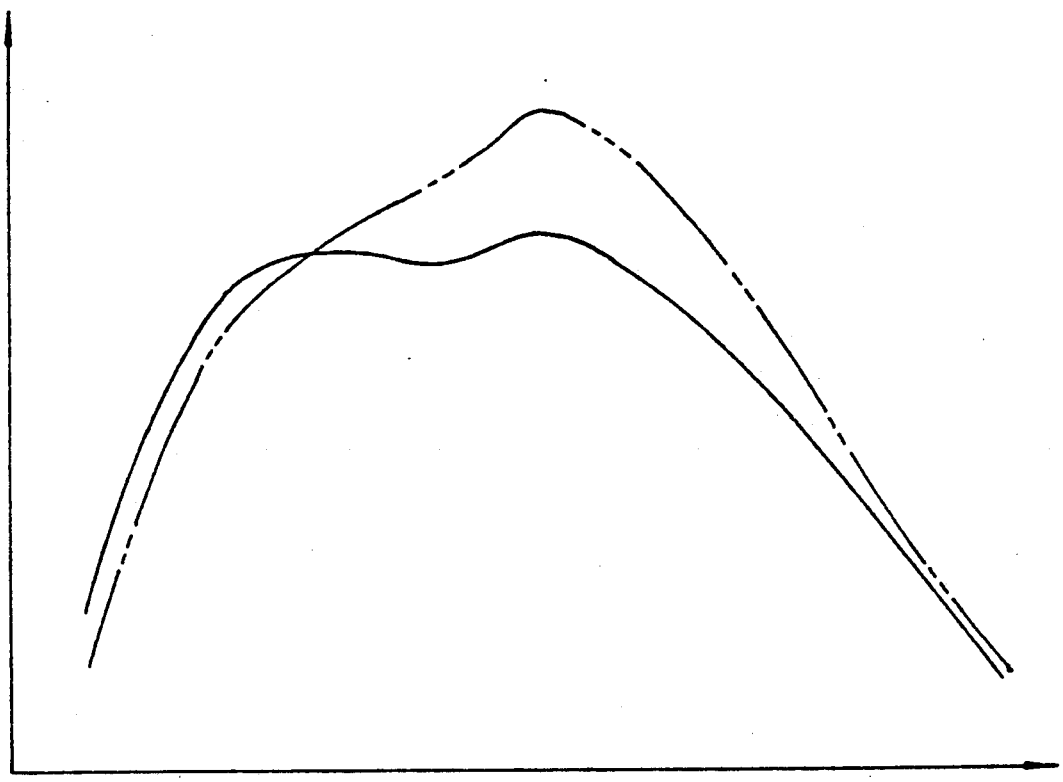
FIG. 3 is a torque to speed curve for an engine of the conventional exhaust supercharged type and an engine constructed in accordance with an embodiment of the invention.

FIG. 3 shows the corresponding torque curves for the conventional engine, A, and an engine constructed in accordance with this embodiment of the invention, B. It will be seen that a flatter torque curve is provided and the peak torque is reduced. This is consistent with the aforedescribed prinicple.

It should be readily apparent, therefore, that the described invention provides some exhaust supercharging but limits the amount and effect of the exhaust supercharging by communicating the separate exhaust manifolds with each other so as to reduce peak heat loading and the likelihood of knocking. Although an embodiment of the invention has been illustrated and described, it is to be understood that various changes and modifications may be made without departing from the spirit and scope of the invention, as defined by the appended claims.

What is claimed is:

1. An exhaust system for a two-cycle engine having a first group of cylinders having their exhaust ports communicating with a first exhaust manifold and a second group of clinders having their exhaust ports all communicating with a second exhaust manifold, the improvement comprising the firing order of said cylinders being such that one cylinder of said first is on its scavenge cycle when one cylinder of said second group is on its exhaust cycle, and means for communicating said exhaust manifolds with each other for restricting the scavenging of said cylinders for reducing torque and heat loading of the engine.

2. An exhaust system as set forth in claim 1 wherein the groups of cylinders are arranged in banks.

3. An exhaust system as set forth in claim 2 wherein the banks are disposed at a V to each other.

4. An exhaust system as set forth in claim 3 wherein the engine is a V6.

5. An exhaust system as set forth in claim 4 wherein the firing order is a cylinder of the first bank, a cylinder of the second bank, a cylinder of the first bank, a cylinder of the second bank, a cylinder of the first bank and a cylinder of the second bank.

6. An exhaust system as set forth in claim 5 wherein the cylinders fire in sequence from one end of the engine to the other.

7. An exhaust system as set forth in claim 1 wherein the exhaust manifolds merge into a common outlet.

8. An exhaust system as set forth in claim 7 wherein the common outlet extends into an expansion chamber.

9. An exhaust system as set forth in cliam 1 wherein the firing order of the cylinders of the groups is such that a pressure pulse from the exhaust gases of one group communicates with the exhaust manifold of the other group for creating a positive pressure at the exhaust port of one cylinder of said other group when its intake and exhaust ports are both opened and substantially before the end of the closing of the exhaust port of said cylinder of said other group.

10. An exhaust system as set forth in claim 9 wherein the groups of cylinders are arranged in banks.

11. An exhaust system as set forth in claim 10 wherein the banks are disposed at a V to each other.

12. An exhaust system as set forth in claim 11 wherein the engine of a V6.

13. An exhaust system as set forth in claim 12 wherein the firing order is a cylinder of the first bank, a cylinder of the second bank, a cylinder of the first bank, a cylinder of the second bank, a cylinder of the first bank and a cylinder of the second bank.

14. An exhaust system as set forth in claim 13 wherein the cylinders fire in sequence from one end of the engine to the other.

15. A exhaust system as set forth in claim 9 wherein the exhaust manifolds merge into a common outlet.

16. An exhaust system as set forth in claim 15 wherein the common outlet extends into an expansion chamber.

* * * * *

UNITED STATES PATENT AND TRADEMARK OFFICE
CERTIFICATE OF CORRECTION

PATENT NO.   :   5,012,648
DATED        :   May 7, 1991
INVENTOR(S)  :   Okumura, et al It is certified that error appears in the above-identified patent and that said Letters Patent is hereby corrected as shown below:

ON THE TITLE PAGE

Abstract line 5, delete "the" (second occurrence).

Column 3, line 33, Claim 1, "clinders" should be --cylinders--.

Column 3, line 36, Claim 1, "after "first" insert --group--.

Column 4, line 17, Claim 9, "cliam" should be --claim--.

Column 4, line 31, Claim 12, "of" should be --is--.

Signed and Sealed this

Eighth Day of June, 1993

Attest:

MICHAEL K. KIRK

Attesting Officer    Acting Commissioner of Patents and Trademarks